United States Patent
Kim et al.

(10) Patent No.: US 9,474,058 B2
(45) Date of Patent: Oct. 18, 2016

(54) METHOD AND APPARATUS OF OPERATING CHANNEL REQUEST AND RESPONDING TO THE OPERATING CHANNEL REQUEST IN A WIRELESS LOCAL AREA NETWORK SYSTEM

(71) Applicant: LG ELECTRONICS INC., Seoul (KR)

(72) Inventors: Eunsun Kim, Gyeonggi-do (KR); Yongho Seok, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 589 days.

(21) Appl. No.: 13/947,277

(22) Filed: Jul. 22, 2013

(65) Prior Publication Data

US 2013/0308577 A1 Nov. 21, 2013

Related U.S. Application Data

(63) Continuation of application No. 12/985,117, filed on Jan. 5, 2011, now Pat. No. 8,514,799.

(60) Provisional application No. 61/369,074, filed on Jul. 30, 2010, provisional application No. 61/367,875, filed on Jul. 27, 2010, provisional application No. 61/362,708, filed on Jul. 9, 2010, provisional application No. 61/357,105, filed on Jun. 22, 2010.

(51) Int. Cl.
*H04W 72/04* (2009.01)
*H04W 48/12* (2009.01)
*H04W 48/20* (2009.01)
*H04W 84/12* (2009.01)

(52) U.S. Cl.
CPC ....... *H04W 72/042* (2013.01); *H04W 72/0406* (2013.01); *H04W 48/12* (2013.01); *H04W 48/20* (2013.01); *H04W 84/12* (2013.01)

(58) Field of Classification Search
CPC ... H04W 16/14; H04W 84/12; H04W 72/00; H04W 28/06; H04W 72/044; H04W 48/16; H04W 48/08
See application file for complete search history.

(56) References Cited

U.S. PATENT DOCUMENTS

| | | | |
|---|---|---|---|
| 2006/0073827 A1* | 4/2006 | Vaisanen ........... | H04W 36/0055 455/436 |
| 2008/0205358 A1* | 8/2008 | Jokela ................. | H04W 28/22 370/338 |

(Continued)

OTHER PUBLICATIONS

International Search Report dated Sep. 30, 2011 in corresponding PCT Application No. PCT/KR2010/009430.

*Primary Examiner* — Jung-Jen Liu
(74) *Attorney, Agent, or Firm* — Morgan, Lewis & Bockius LLP

(57) ABSTRACT

A method for operating channel request and responding to the operating channel request in a wireless local area network (WLAN) is disclosed. A method of operating channel request by a first station in a regulatory domain where an unlicensed device is permitted to operate at a given time in a given geographical area with regard to a licensed device in a wireless local area network (WLAN) comprises transmitting, to a second station, first frame including a first operating class field and a first channel number field, wherein the first operating class field indicates a number of an operating class of a first channel included in a first channel set for operating channel request and the first channel number field indicates a number of the first channel; and receiving, from the second station, second frame including a second operating class field and a second channel number field, wherein the second operating class field indicates a number of a operating class of a second channel included in a second channel set granted by the second station and the second channel number field indicates a number of the second channel.

11 Claims, 11 Drawing Sheets

(56) References Cited

U.S. PATENT DOCUMENTS

| | | | | |
|---|---|---|---|---|
| 2009/0061783 A1* | 3/2009 | Choi | ................ | H04L 1/0004 455/68 |
| 2010/0046440 A1* | 2/2010 | Singh | ................ | H04W 16/14 370/329 |
| 2011/0110349 A1* | 5/2011 | Grandhi | ................ | H04W 28/18 370/338 |
| 2011/0116458 A1* | 5/2011 | Hsu | ................ | H04W 16/14 370/329 |
| 2011/0280228 A1* | 11/2011 | McCann | ................ | H04W 48/14 370/338 |

* cited by examiner

| Element ID | Length | DSE Registered Location element body field |
|---|---|---|
| 1 | 1 | 20 |

Octets :

Figure 9

| Element ID | Lenght | WSM Type | WSM Information |
|---|---|---|---|

Octets: 1 1 1 variable

Figure 10

These two fields are repeated, as determined by the Length field.

| Info ID | Length | Requester STA address | Responder STA address | Operating Class | Channel Number |
|---|---|---|---|---|---|

Octets: 1 2 1 1 1 1

Figure 11

These three fields are repeated, as determined by the Length field.

| Info ID | Length | Requester STA address | Responder STA address | Operating Class | Channel Number | Maximum Transmit Power |
|---|---|---|---|---|---|---|

Octets: 1 2 1 1 1 1 1

Figure 12

| Category | Action Value | Requester STA Address | Responder STA Address | Operating Channel Type | Length | Regulatory Classs | Channel Number |
|---|---|---|---|---|---|---|---|
| | | | | | | | |

Octets :  1   1   6   6   1   1   1   1

These two fields are repeated, as determined by the Length field.

Figure 13

| Category | Action Value | Requester STA Address | Responder STA Address | Operating Classs | Channel Number | Maximum Transmit Power Level |
|---|---|---|---|---|---|---|
| Octets : 1 | 1 | 6 | 6 | 1 | 1 | 1 |

Figure 14

These two fields are repeated, as determined by the Length field

| Category | Action Value | Requester STA Address | Responder STA Address | Length | New Regulatory Classs | New Channel Number |
|---|---|---|---|---|---|---|
| Octets : 1 | 1 | 6 | 6 | 1 | 1 | 1 |

Figure 15

| Category | Action Value | Requester STA Address | Responder STA Address | New Regulatory Classs | New Channel Number |
|---|---|---|---|---|---|
| Octets : 1 | 1 | 6 | 6 | 1 | 1 |

METHOD AND APPARATUS OF OPERATING CHANNEL REQUEST AND RESPONDING TO THE OPERATING CHANNEL REQUEST IN A WIRELESS LOCAL AREA NETWORK SYSTEM

CROSS REFERENCE TO RELATED APPLICATIONS

This application is a continuation of U.S. patent application Ser. No. 12/985,117, filed on Jan. 5, 2011, which claims the benefit of the U.S. provisional Application Nos. 61/367,875, 61/369,074, 61/357,105, and 61/362,708, filed on Jul. 27, 2010, Jul. 30, 2010, Jun. 22, 2010, and Jul. 9, 2010, respectively, the entire disclosure of each of which is hereby incorporated by reference as if fully set forth herein for all purposes.

BACKGROUND OF THE INVENTION

1. Field of the Invention

The present invention relates to a wireless local area network (WLAN), and more particularly, to a method for operating channel request and responding to the operating channel request in a wireless local area network (WLAN).

2. Discussion of the Related Art

The standard for a Wireless Local Area Network (WLAN) technology is established by IEEE 802.11 standard association. IEEE 802.11a/b among IEEE 802.11 standards provides 11 Mbps (IEEE 802.11b) or 54 Mbps (IEEE 802.11a) transmission efficiency using unlicensed band on 2.4. GHz or 5 GHz frequency band. IEEE 802.11g, adapting OFDM (Orthogonal Frequency Divisional Multiplexing) technology, provides 54 Mbps transmission efficiency. And, IEEE 802.11n, adapting MIMO-OFDM technology, provides 300 Mbps transmission efficiency for 4 spatial streams. IEEE 802.11n provides 40 MHz channel bandwidth, and in this case it provides up to 600 Mbps transmission efficiency.

Now, a standard for regulating the WLAN operation in TV White Space is under establishment, as IEEE 802.11af.

TV Whitespace includes channels allocated to broadcast TV, which are permitted to be used by cognitive radio device. TV White Space may include UHF band and VHF band. The spectrum not used by a licensed device (hereinafter, can be called as 'White Space') can be used by an unlicensed device. The frequency band permitted to be used by unlicensed device can be differently defined for each country. Generally, this frequency band comprises 54-698 MHz (US, Korea), and some of this frequency band can't be used for the unlicensed device. Here, 'licensed device' means a device of the user permitted in this frequency band, and can be differently called as 'primary user', or 'incumbent user'. Hereinafter, the term of 'incumbent user' can be collectively used for these terms.

The unlicensed device, which wishes to use the TV White Space (TVWS), shall acquire information for available channel list at its location. Hereinafter, the unlicensed device operating in the TVWS using MAC (Medium Access Control) and PHY (Physical) operation according to IEEE 802.11 can be called as TVWS terminal.

Unlicensed device should provide a protection mechanism for the incumbent user. That is, the unlicensed device should stop using a specific channel, when an incumbent user, such as wireless microphone, is using that specific channel. For this purpose, spectrum sensing mechanism is required. Spectrum sensing mechanism comprises Energy Detection scheme, Feature Detection scheme, etc. By using this mechanism, unlicensed device determines that the channel is used by an incumbent user, when the strength of the primary signal is greater than a predetermined level, or when DTV (Digital Television) Preamble is detected. And, the unlicensed device (station or Access Point) shall lower its transmission power, when it is detected that the neighboring channel, next to the channel used by the unlicensed device, is used by the incumbent user.

SUMMARY OF THE INVENTION

Technical Problem

One aspect of the present invention is for providing a method for operating channel request in a WLAN.

The object of the present invention is not limited the above stated objects, but includes various objects recited or apparent among the detailed description of the present invention.

Technical Solution

One aspect of the present invention provides a method of operating channel request by a first station in a regulatory domain an unlicensed device is permitted to operate at a given time in a given geographical area with regard to a licensed device in a wireless local area network (WLAN) comprising transmitting, to a second station, first frame including a first operating class field and a first channel number field, wherein the first operating class field indicates a number of an operating class of a first channel included in a first channel set for operating channel request and the first channel number field indicates a number of the first channel; and receiving, from the second station, second frame including a second operating class field and a second channel number field, wherein the second operating class field indicates a number of a operating class of a second channel included in a second channel set granted by the second station and the second channel number field indicates a number of the second channel.

Preferably, the method further comprises receiving, from the second station, the list of available channels; and selecting preferred operating channels from the available channels, wherein the first channel set is the preferred operating channels.

Preferably, the first station may transmit the first frame whenever the list of available channels has been changed.

Preferably, the first station may transmit the first frame whenever it wants to change channels for use.

Preferably, the second channel set may be a subset of the first channel set.

Preferably, the second frame further includes a maximum transmit power field indicating a maximum allowable transmit power on the second channel.

Preferably, the first frame and the second frame may be transmitted using a GAS (generic advertisement service) protocol.

Another aspect of the present invention provides a method of operating channel response by a first station in a regulatory domain an unlicensed device is permitted to operate at a given time in a given geographical area with regard to a licensed device in a wireless local area network (WLAN) comprising receiving, from a second station, first frame including a first operating class field and a first channel number field, wherein the first operating class field indicates a number of an operating class of a first channel included in a first channel set for operating channel request and the first channel number field indicates a number of the first channel; and transmitting, to the second station, second frame including a second operating class field and a second channel number field, wherein the second operating class field indicates a number of a operating class of a second channel included in a second channel set granted by the first station and the second channel number field indicates a number of the second channel.

Another aspect of the present invention provides an apparatus of operating channel request in a regulatory domain an unlicensed device is permitted to operate at a given time in a given geographical area with regard to a licensed device in a wireless local area network (WLAN) comprising a transceiver configured to transmit, to a station, first frame including a first operating class field and a first channel number field, and receive, from the station, second frame including a second operating class field and a second channel number field; and a processor configured to generate the first frame, wherein the first operating class field indicates a number of an operating class of a first channel included in a first channel set for operating channel request and the first channel number field indicates a number of the first channel, wherein the second operating class field indicates a number of a operating class of a second channel included in a second channel set granted by the second station and the second channel number field indicates a number of the second channel.

Another aspect of the present invention provides an apparatus of operating channel response in a regulatory domain where an unlicensed device is permitted to operate at a given time in a given geographical area with regard to a licensed device in a wireless local area network (WLAN) comprising a transceiver configured to receiving, from a station, first frame including a first operating class field and a first channel number field, and transmit, to the second station, second frame including a second operating class field and a second channel number field; and a processor configured to generate the second frame, wherein the first operating class field indicates a number of an operating class of a first channel included in a first channel set for operating channel request and the first channel number field indicates a number of the first channel, wherein the second operating class field indicates a number of a operating class of a second channel included in a second channel set granted by the first station and the second channel number field indicates a number of the second channel.

BRIEF DESCRIPTION OF THE DRAWINGS

The accompanying drawings, which are included to provide a further understanding of the invention, illustrate embodiments of the invention and together with the description serve to explain the principle of the invention.

In the drawings:

FIG. 9 shows a White Space Map information element.

FIG. 10 shows the format of first query protocol element.

FIG. 11 shows the format of second query protocol element.

FIG. 12 shows the format of a frame for operating channel request.

FIG. 13 shows the format of a frame for operating channel response.

FIG. 14 shows the format of DSE Channel Switch Request frame.

FIG. 15 shows the format of DSE Channel Switch Response frame.

DETAILED DESCRIPTION OF THE INVENTION

Reference will now be made in detail to the embodiments of the present invention, examples of which are illustrated in the accompanying drawings. Wherever possible, the same reference numbers will be used throughout the drawings to refer to the same or like parts.

Prior to describing the present invention, it should be noted that most terms disclosed in the present invention correspond to general terms well known in the art, but some terms have been selected by the applicant as necessary and will hereinafter be disclosed in the following description of the present invention. Therefore, it is preferable that the terms defined by the applicant be understood on the basis of their meanings in the present invention.

For the convenience of description and better understanding of the present invention, general structures and devices well known in the art will be omitted or be denoted by a block diagram or a flow chart.

First of all, Wireless Local Area Network (WLAN) system in which embodiments of the present invention can be applied is explained.

Figure 1:
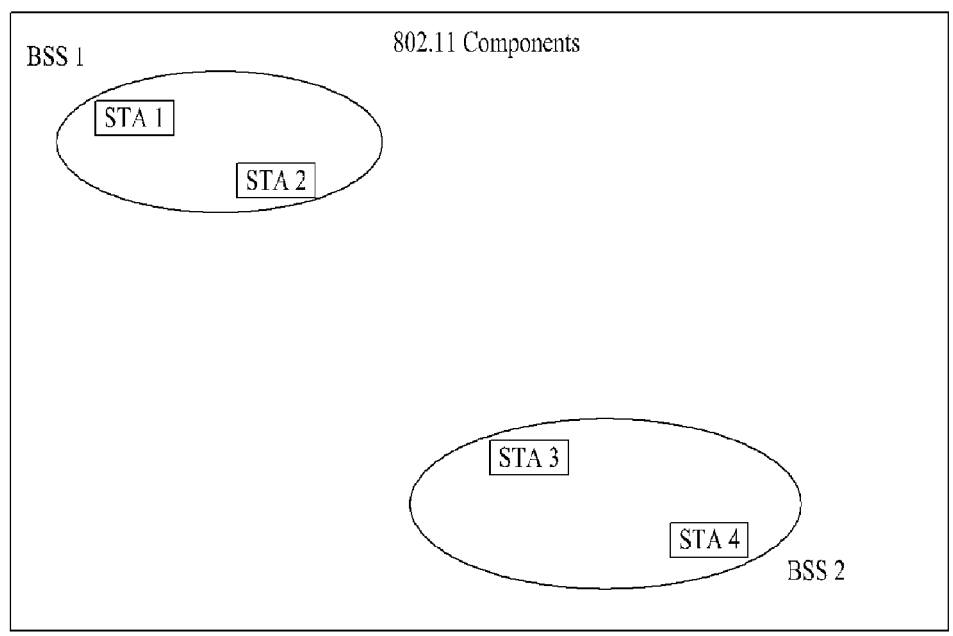
FIG. 1 shows an exemplary architecture of IEEE 802.11 system.

FIG. 1 shows an exemplary architecture of IEEE 802.11 system.

The IEEE 802.11 architecture consists of several components that interact to provide a WLAN that supports STA (station) mobility transparently to upper layers. The basic service set (BSS) is the basic building block of an IEEE 802.11 LAN. FIG. 1 shows two BSSs, each of which has two STAs that are members of the BSS. It is useful to think of the ovals used to depict a BSS as the coverage area within which the member STAs of the BSS may remain in communication. (The concept of area, while not precise, is often good enough.) This area is called the Basic Service Area (BSA). If a STA moves out of its BSA, it can no longer directly communicate with other STAs present in the BSA.

The independent BSS (IBSS) is the most basic type of IEEE 802.11 LAN. A minimum IEEE 802.11 LAN may consist of only two STAs. Since the BSSs shown in FIG. 1 are simple and lack other components (contrast this with FIG. 2), the two can be taken to be representative of two IBSSs. This mode of operation is possible when IEEE 802.11 STAs are able to communicate directly. Because this type of IEEE 802.11 LAN is often formed without pre-planning, for only as long as the LAN is needed, this type of operation is often referred to as an ad hoc network.

A STA's membership in a BSS is dynamic (STAs turn on, turn off, come within range, and go out of range). To become a member of a BSS, a STA joins the BSS using the synchronization procedure. To access all the services of an infrastructure BSS, a STA shall become "associated." These associations are dynamic and involve the use of the distribution system service (DSS).

Figure 2:
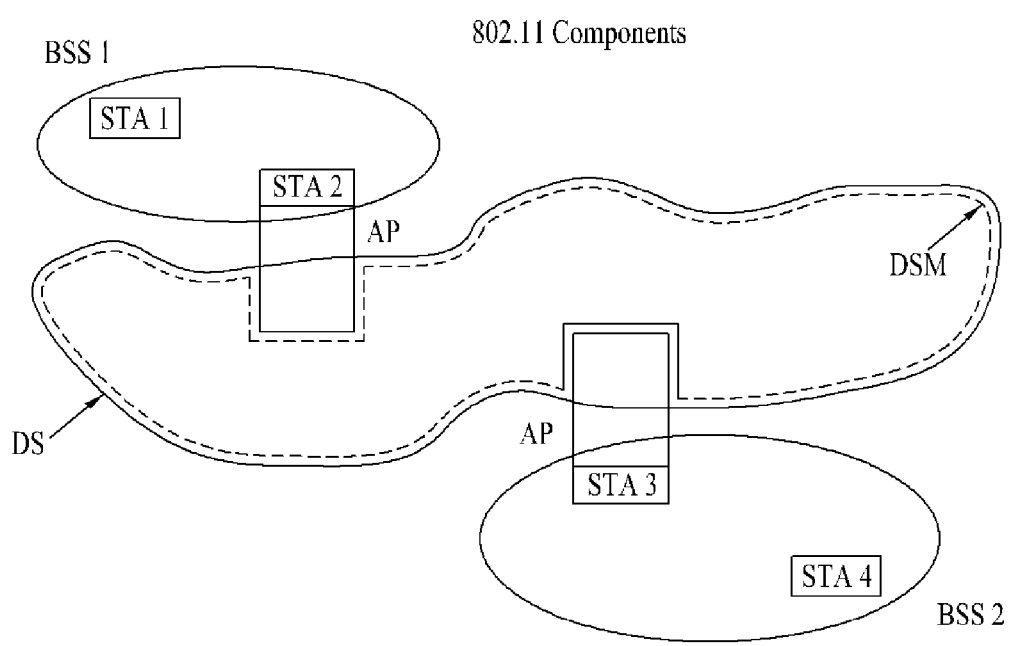
FIG. 2 is another exemplary architecture of IEEE 802.11 system in which the DS, DSM and AP components are added to the IEEE 802.11 architecture picture.

FIG. 2 is another exemplary architecture of IEEE 802.11 system in which the DS, DSM and AP components are added to the IEEE 802.11 architecture picture.

PHY limitations determine the direct station-to-station distance that may be supported. For some networks, this distance is sufficient; for other networks, increased coverage is required. Instead of existing independently, a BSS may also form a component of an extended form of network that is built with multiple BSSs. The architectural component used to interconnect BSSs is the DS (Distribution System).

IEEE Std 802.11 logically separates the WM (wireless Medium) from the distribution system medium (DSM). Each logical medium is used for different purposes, by a different component of the architecture. The IEEE 802.11 definitions neither preclude, nor demand, that the multiple media be either the same or different.

Recognizing that the multiple media are logically different is the key to understanding the flexibility of the architecture. The IEEE 802.11 LAN architecture is specified independently of the physical characteristics of any specific implementation.

The DS enables mobile device support by providing the logical services necessary to handle address to destination mapping and seamless integration of multiple BSSs.

An access point (AP) is any entity that has STA functionality and enables access to the DS, via the WM for associated STAs.

Data move between a BSS and the DS via an AP. Note that all APs are also STAs; thus they are addressable entities. The addresses used by an AP for communication on the WM and on the DSM are not necessarily the same.

Data sent to the AP's STA address by one of the STAs associated with it are always received at the uncontrolled port for processing by the IEEE 802.1x port access entity. In addition, if the controlled port is authorized, these frames conceptually transit the DS.

Hereinafter, Extended Service Set (ESS) for a large coverage network is explained.

Figure 3:
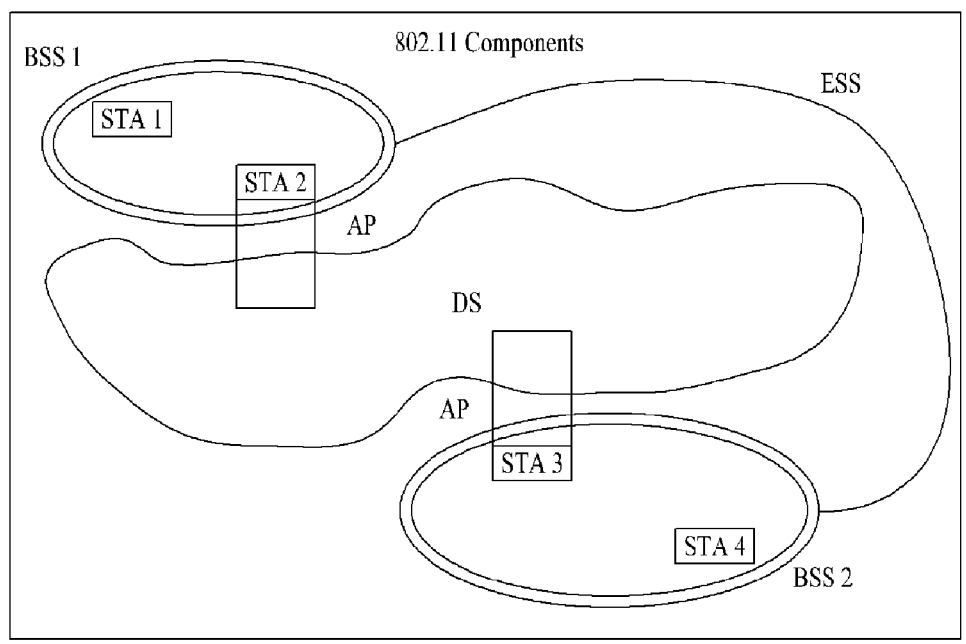
FIG. 3 shows another exemplary architecture of IEEE 802.11 system for explaining the concept of ESS.

FIG. 3 shows another exemplary architecture of IEEE 802.11 system for explaining the concept of ESS.

The DS and BSSs allow IEEE Std 802.11 to create a wireless network of arbitrary size and complexity. IEEE Std 802.11 refers to this type of network as the ESS network. An ESS is the union of the BSSs connected by a DS. The ESS does not include the DS. The key concept is that the ESS network appears the same to an LLC (logical link control) layer as an IBSS network. STAs within an ESS may communicate and mobile STAs may move from one BSS to another (within the same ESS) transparently to LLC.

Nothing is assumed by IEEE Std 802.11 about the relative physical locations of the BSSs in FIG. 3. All of the following are possible:

The BSSs may partially overlap. This is commonly used to arrange contiguous coverage within a physical volume.

The BSSs could be physically disjoint. Logically there is no limit to the distance between BSSs.

The BSSs may be physically collocated. This may be done to provide redundancy.

One (or more) IBSS or ESS networks may be physically present in the same space as one (or more) ESS networks. This may arise for a number of reasons. Some examples are when an ad hoc network is operating in a location that also has an ESS network, when physically overlapping IEEE 802.11 networks have been set up by different organizations, and when two or more different access and security policies are needed in the same location.

Figure 4:
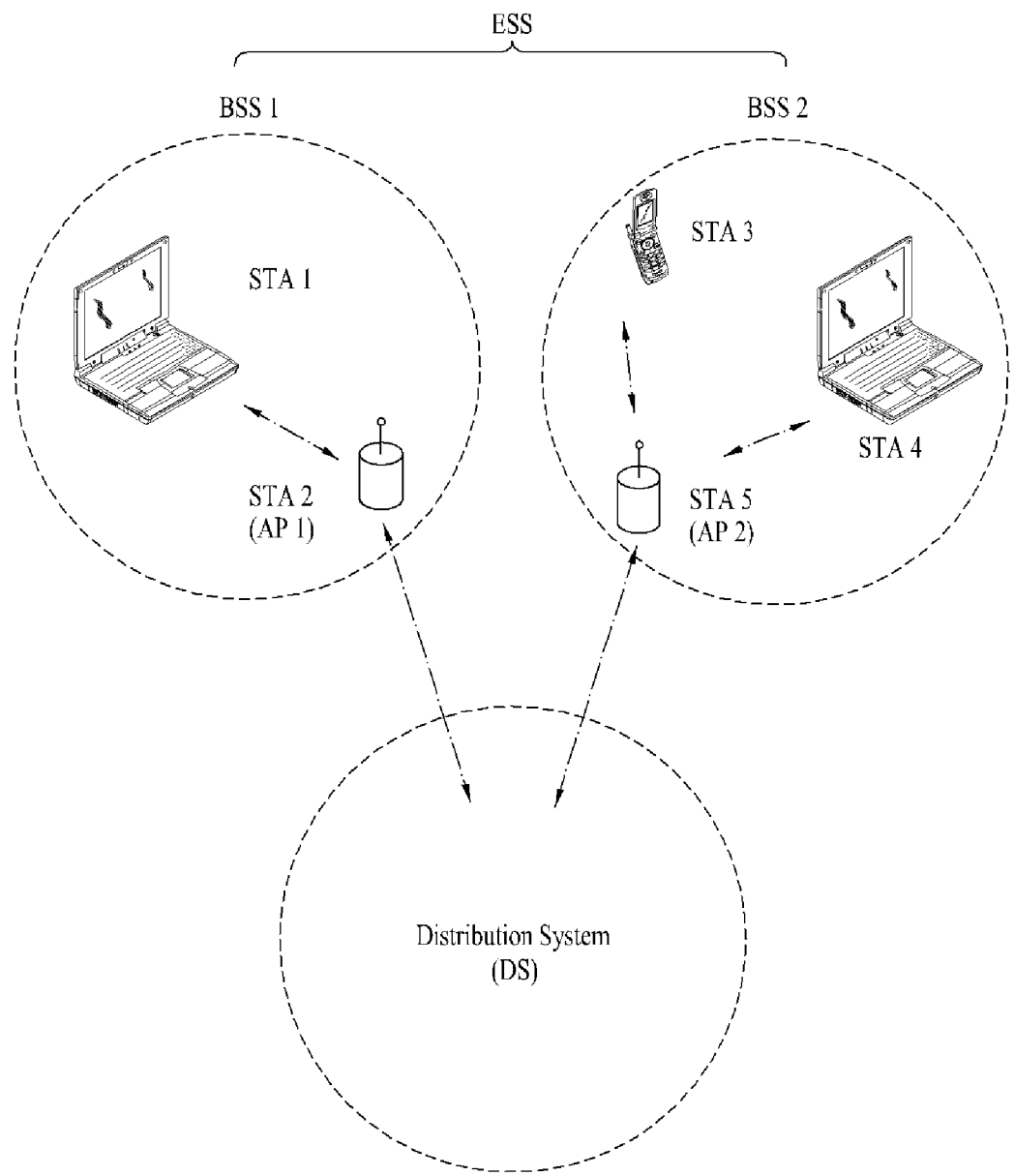
FIG. 4 shows exemplary system architecture for better understanding the WLAN system.

FIG. 4 shows exemplary system architecture for better understanding the WLAN system.

As can be understood, FIG. 4 is an example of infrastructure BSS including DS. And BSS 1 and BSS 2 consist of ESS. In WLAN system, a STA is a device operating according to MAC/PHY regulation of IEEE 802.11, and includes an AP STA and non-AP STA, such a laptop computer, mobile phone, etc. Usually, the device which a user directly handles is non-AP STA. Hereinafter, non-AP STA can be differently called as (terminal), WTRU (Wireless Transmit/Receive Unit), User Equipment (UE), Mobile Station (MS), Mobile Terminal, Mobile Subscriber Unit, etc. And, non-AP STA, which can operate within TVWS spectrum, can be called as 'Non-AP STA' or 'STA'. AP can corresponds to Base Station (BS), Node-B, BTS (Base Transceiver System), or Femto BS in another field of wireless communication.

First, the enabling mechanism of letting the unlicensed device to operate in TVWS is explained.

In order for the unlicensed device to operate in TVWS, the unlicensed device should acquire information for available channels in TVWS not used by incumbent users. The most casual approach for this is defining such that all the unlicensed devices performs sensing whether there is a primary signal of the incumbent user on each of the channels in TVWS. However, it may cost huge overhead, thus another approach can be using a regulatory database, such as TV band database which includes information which of the channels are available for the WLAN operation at specific geographic location. The present invention prefers to use the latter approach.

Further, if all the unlicensed devices access the regulatory database to acquire information for the available channels, it may be inefficient, and produce large signaling overhead. Thus, the unlicensed devices (STAs) are classified into an enabling STA and a dependent STA. Enabling STA in TVWS is defined as a STA determines the available TV channels at its location using its own geographic location identification and TV bands database access capabilities. Dependent STA in TVWS is defined as a STA receives available TV channel list from the enabling STA or the dependent AP of that enabling STA that enables its operation. Thus, enabling STA takes the role to permit the dependent STA to operate within TVWS within the available channels (the role to enable the dependent STA). Enabling STA can be not only a WLAN STA but also a logical entity of a network server which provides service related with enablement. This enabling procedure can be called as dynamic station enablement (DSE) procedure.

Figures 5, 6:
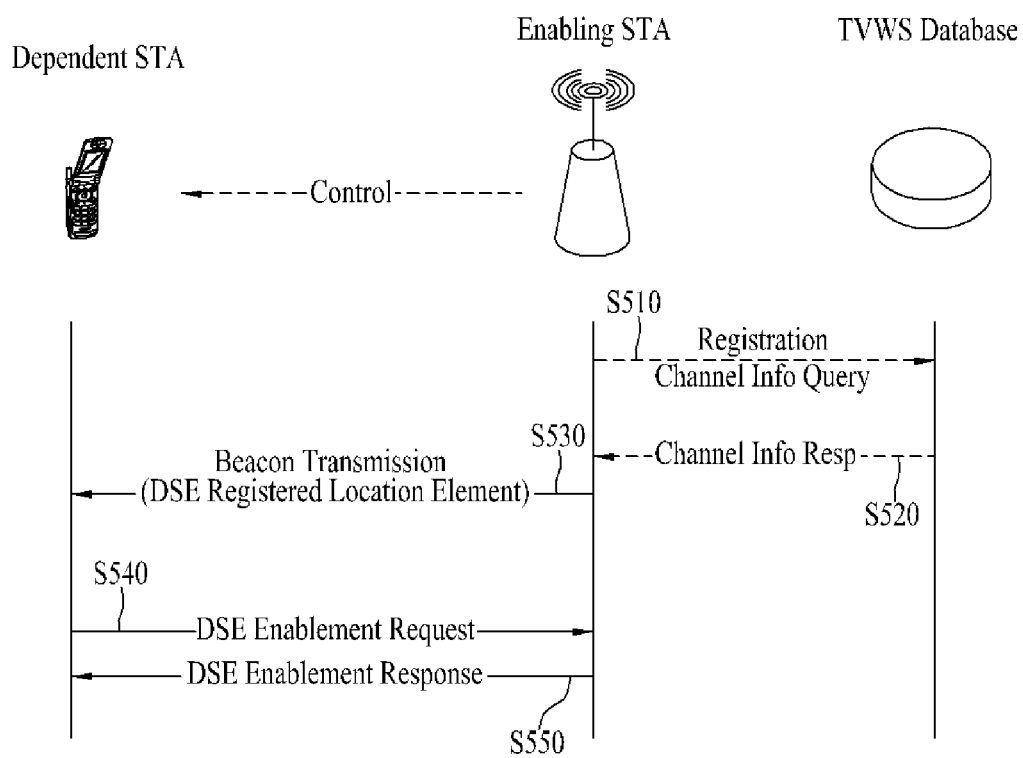
FIG. 5 is a conceptual diagram to explain the enabling mechanism.
FIG. 6 shows an exemplary format of DSE Registered Location Element.

FIG. 5 is a conceptual diagram to explain the enabling mechanism.

In FIG. 5, there is TVWS database, an enabling STA and a dependent STA. The enabling STA can be either an AP STA or non-AP STA.

According to the embodiment, the enabling STA accesses the TVWS database for registration and/or querying channel information (S510). It is more efficient for the enabling STA to acquire available channel list from TVWS database than sensing each of the channels to determine whether it is available or not. Thus, the enabling STA of FIG. 5 acquires the available channel list from TVWS database via Channel Info Response (S520).

Then, the enabling AP STA of this example may transmit beacon frame or probe response frame to the dependent STA (S530) as an enabling signal to permit the dependent STA to operate within TVWS. This enabling signal comprises the probe response frame or the beacon frame containing a DES Registered Location Element with 'DSE RegLoc bit' set to 1. Also, the probe response frame or the beacon frame containing RLQP ID can be an enabling signal.

However, enabling STA can transmit enabling signal on the band other than the TVWS. For example, the enabling STA can transmit the beacon frame containing a DES Registered Location Element with 'DSE RegLoc bit' set to 1 through 2.4 GHz band.

And, the dependent STA, according to the present embodiment, may exchange DSE related message with the enabling STA. More specifically, the dependent STA may transmit DSE Enablement Request message to the enabling STA for the enablement of the dependent STA (S540). Then, the enabling STA may respond to this request by DSE Enablement Response message (S550).

Figures 7, 8:
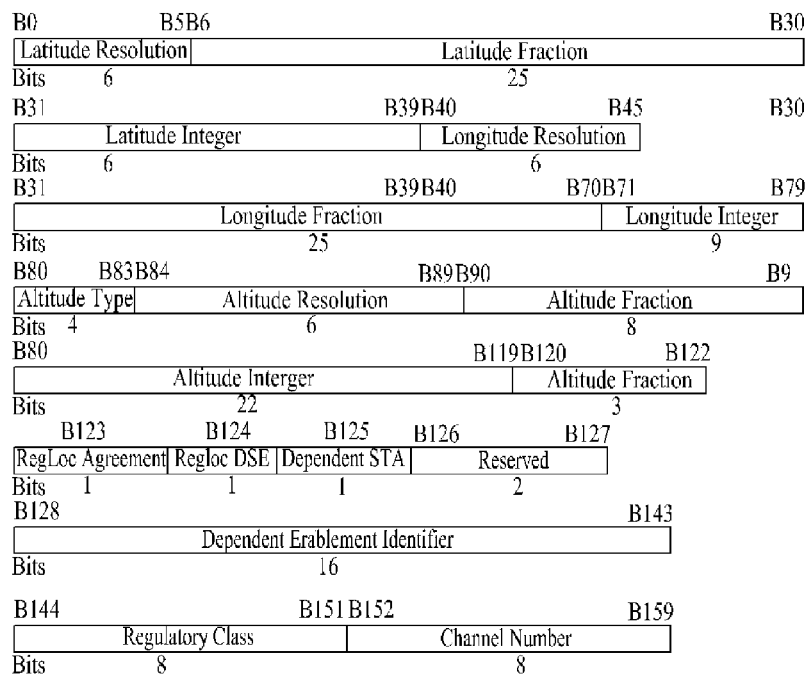
FIG. 7 shows an exemplary format of Registered Location element body field.
FIG. 8 shows an exemplary DSE Enablement Frame format.

FIG. 6 shows an exemplary format of DSE Registered Location Element, and FIG. 7 shows an exemplary format of Registered Location element body field.

As stated above, DSE Registered Location element (FIG. 6) with RegLoc DSE bit (FIG. 7) set to 1 can be an enabling signal permitting the dependent STA to operate WLAN operation in TVWS. The dependent STA, receiving and decoding the DSE Registered Location element, may transmit Enablement Request Frame to the Enabling STA. The dependent STA shall transmit the Enablement Request Frame on a channel identified by 'Channel Number' field of Registered Location element body, as shown in FIG. 7. This channel identified by 'Channel Number' field of Registered Location element body can be located other than TVWS, or within TVWS. Then, the enabling STA transmits Enablement Response Frame to the dependent STA, and if the dependent STA receives it, the DSE procedure is completed.

FIG. 8 shows an exemplary DSE Enablement Frame format.

When DSE Enablement Frame format of FIG. 8 is DSE Enablement frame for DSE Enablement Request, RequesterSTAAddress field indicates MAC address of STA transmitting this DSE Enablement Frame, and ResponderSTAAddress field indicates MAC address of STA receiving this DSE Enablement Frame. Reason Result Code field may indicates whether this DSE Enablement Frame is for DSE Enablement Request, or DSE Enablement Response. Enablement identifier field may indicate enablement ID allocated by the enabling STA to the dependent STA, when DSE Enablement Frame is for DSE Enablement Response.

Thus, RequesterSTAAddress field of the DSE Enablement frame for DSE Enablement request transmitted by dependent STA indicates the MAC address of the dependent STA, and ResponderSTAAddress field indicates the MAC address of the enabling STA, and Reason Result Code field indicates this DSE Enablement Frame is for DSE Enablement Request. And, Enablement identifier field is set to invalid value.

When DSE Enablement Frame format of FIG. 8 is for DSE Enablement Response, the RequesterSTAAddress field of the DSE Enablement frame for DSE Enablement Response indicates the MAC address of the enabling STA, ResponderSTAAddress field indicates the MAC address of the Dependent STA, Reason Result Code field indicates that the DSE Enablement frame is for DSE Enablement Response. And, Enablement identifier field may include Enablement ID allocated to the dependent STA by the enabling STA.

Next, procedure that a dependent STA acquires an available channel list will be explained.

A dependent STA acquires an available channel list through query to data base or broadcast from an enabling STA.

A dependent STA can use GAS (generic advertisement service) Request/Response action management frame to query available channel list. GAS Request/Response action management frame is a public action frame and can be transmitted when connection between the dependent STA and the Enabling STA is not setup.

Table 1 shows GAS Request action management frame format and Table 2 shows GAS Response action management frame format.

TABLE 1

| Order | Information |
| --- | --- |
| 1 | Category |
| 2 | Action |
| 3 | Dialog Token |
| 4 | Advertisement Protocol element |
| 5 | Query Request Length |
| 6 | Query Request |

TABLE 2

| Order | Information |
| --- | --- |
| 1 | Category |
| 2 | Action |
| 3 | Dialog Token |
| 4 | Status Code |
| 5 | GAS Comeback Delay |
| 6 | Advertisement Protocol element |
| 7 | Query Response Length |
| 8 | Query Response (optional) |

A dependent STA transmits a GAS Request action management frame to an enabling STA to query Available channel list, then an enabling STA transmits a GAS Response action management frame including an available channel list to a dependent STA.

The GAS Response action management frame includes white space map information element. FIG. 9 shows a White Space Map (WSP) information element. WSM signals available frequencies in the TVWS, which can be represented as available TV Channel Numbers.

As shown in FIG. 9, WSM information element may comprise Element ID field, Length field, WSM Type field and WSM Information field.

Element ID field may indicate that this element is White Space Map element. Length field has a variable value in a unit of octet corresponding to the length of WSM. Since the numbers of available channels and corresponding maximum power level values are variable, the length field may indicate the length of WSM element. WSM type field may indicate the type of WSM information. Specifically, WSM type may indicate whether WSM information is TV Band WSM, or other type of WSM.

WSM element comprises available channel list and maximum allowed transmission power of the available channels.

In FIG. 9, WSM Information field includes Channel Number field and Maximum Power Level field.

The Channel Number field may be a positive integer value that indicates where the TV channel is available for WLAN operation, and the Maximum Power Level field indicates maximum allowed transmission powers of the available channels.

Alternatively, WSM Information includes available frequencies and maximum transmission power level allowed on each frequency.

When a dependent STA does not query an available channel list, it uses an available channel list broadcasted or unicasted by an enabling STA. An enabling STA may transmit White Space Map information element through a Beacon frame, a Probe Response frame or Public Action frame containing a WSM.

Next, a method for operating channel request and responding to the operating channel request according to first embodiment of the present invention is explained.

After DSE enabling procedure and acquiring available channel list, a dependent STA performs operating channel request procedure. The dependent STA performs operating channel request procedure using GAS protocol according to first embodiment of the present invention, while the dependent STA performs operating channel request procedure using Public Action frames according to second embodiment of the present invention. The Public Action frame is defined to allow inter-BSS and AP to unassociated-STA communications in addition to intra-BSS communication. In addition, it can be exchanged between an AP and its associated-STA as well. According to first embodiment of the present invention, the dependent STA may transmit the query protocol element to its enabling STA or its associated dependent AP to request its preferred operating channels using GAS protocol.

The dependent STA selects preferred operating channels based on the White Space Map. That is, the dependent STA selects preferred channels among available channels for regulatory class the dependent STA supports. And, the dependent STA transmits first query protocol element including the selected channels to an enabling STA using GAS (generic advertisement service) protocol. The first query protocol element can be called as Operating Channel Request element or Network Channel Control element. Whenever the available channel list has been changed by the update of the database information or detection of the primary service signals, the dependent STAs may transmit the first query protocol element. And, the dependent STAs may transmit the first query protocol element whenever it wants to change channels for use.

In the embodiment of the present invention, operating channel request procedure is performed through RLQP (Registered Location Query Protocol). RLQP is a query protocol for registered location information retrieval transported by GAS Public Action frames.

FIG. 10 shows the format of first query protocol element.

Shown in FIG. 10, first query protocol element includes an Info ID field, a Length field, a RequesterSTAAddress field, a ResponderSTAAddress field, an Operating Class field and a Channel Number field.

The Info ID field shall be set to the pre-defined value for Operating Channel Request or Network Channel Control. Info ID indicates what the query protocol element is related with. The Length indicates the length of the remaining element fields in octets. The RequesterSTAAddress field is the MAC address of the requesting STA that requests operating channels. The ResponderSTAAddress field is the MAC address of the responding STA that grants operating channels.

The Operating Class field is set to the number of the operating class of channel included in the channel set for operating channel request. The Channel Number field is set to the number of channel included in the channel set for operating channel request. The Operating Class field and Channel Number field together specify the channel frequency and channel bandwidth of the operating channel the dependent STA requests.

An enabling STA or a dependent AP that receives the first query protocol element responds with second query protocol element by which the enabling STA or the dependent AP confirms the operating channel request. When the enabling STA or the dependent AP transmits the second query protocol element, it transmits the confirmed channel list and the maximum transmit power level as well. The channel list the enabling STA or the dependent AP confirms may be the same channels listed in the first query protocol element or the subset channel list of channels listed in the first query protocol element. The second query protocol element can be Operating Channel Response element or Network Channel Control element.

FIG. 11 shows the format of second query protocol element.

Shown in FIG. 11, second query protocol element includes an Info ID field, a Length field, a RequesterSTAAddress field, a ResponderSTAAddress field, an Operating Class field, a Channel Number field and a Maximum Transmit Power field.

The Info ID field shall be set to the pre-defined value for Operating Channel Response or Network Channel Control. The Length indicates the length of the remaining element fields in octets. The RequesterSTAAddress field is the MAC address of the requesting STA that requests operating channels. The ResponderSTAAddress field is the MAC address of the responding STA that grants operating channels.

The Operating Class field is set to the number of the operating class of the channel included in the channel set for operating channel response. The Channel Number field is set to the number of the channel included in the channel set for operating channel response. The Operating Class field and Channel Number field together specify the channel granted by the enabling STA or the dependent AP.

The dependent STA can select a set of preferred channels from the list of available channels and the enabling STA can grant a subset of the channels selected by the dependent STA or all of the selected channels.

The Maximum Transmit Power field gives the maximum allowable transmit power on the granted channel in dBm for TV bands operation.

Next, a method for operating channel request and responding to the operating channel request according to second embodiment of the present invention is explained.

According to second embodiment of the present invention, the dependent STA may transmit a frame to its enabling STA or its associated dependent AP to request its preferred operating channels.

The dependent STA selects preferred operating channels based on the White Space Map. And, the dependent STA transmits first frame including the selected channels to an enabling STA. The first frame can be Operating Channel Request frame or Network Channel Control frame.

FIG. 12 shows the format of first frame.

Shown in FIG. 12, first frame includes a Category field, an Action Value field, a RequesterSTAAddress field, a ResponderSTAAddress field, an Operating Channel Type field, a Length field, an Operating Class field and a Channel Number field.

The RequesterSTAAddress field is the MAC address of the requesting STA that requests operating channels. The ResponderSTAAddress field is the MAC address of the responding STA that grants operating channels.

The Operating Channel Type field indicates operation type of a operating channel the dependent STA requests. For example, the operating channel is used for infrastructure BSS when Operating Channel Type is 1, the operating channel is used for IBSS when Operating Channel Type is 2, the operating channel is used for TDLS Off-channel when Operating Channel Type is 3, and the operating channel is used arbitrarily when Operating Channel Type is 4.

The Operating Class field is set to the number of the operating class of channel included in the channel set for operating channel request. The Channel Number field is set to the number of channel included in the channel set for operating channel request. The Operating Class field and Channel Number field together specify the channel frequency and channel bandwidth of the operating channel the dependent STA requests.

An enabling STA or a dependent AP that receives the first frame responds with second frame by which the enabling STA or the dependent AP confirms the operating channel request. When the enabling STA or the dependent AP transmits the second frame, it transmits the confirmed channel list and the maximum transmit power level as well. The channel list the enabling STA or the dependent AP confirms may be the same channels listed in the first frame or the subset channel list of channels listed in the first frame. The second frame can be Operating Channel Response frame or Network Channel Control frame.

FIG. 13 shows the format of second frame.

Shown in FIG. 13, second frame includes a Category field, an Action Value field, a Length field, a RequesterSTAAddress field, a ResponderSTAAddress field, an Operating Class field, a Channel Number field and a Maximum Transmit Power field determined by the enabling STA.

The RequesterSTAAddress field is the MAC address of the requesting STA that requests operating channels. The ResponderSTAAddress field is the MAC address of the responding STA that grants operating channels.

The Operating Class field is set to the number of the operating class of the channel included in the channel set for operating channel response. The Channel Number field is set to the number of the channel included in the channel set for operating channel response. The Operating Class field and Channel Number field together specify the channel granted by the enabling STA or the dependent AP.

The dependent STA can select a set of preferred channels from the list of available channels and the enabling STA can grant a subset of the channels selected by the dependent STA or all of the selected channels.

The Maximum Transmit Power field gives the maximum allowable transmit power on the granted channel in dBm for TV bands operation.

Next, a method for channel switch request and response according to third embodiment of the present invention is explained.

When an enabling STA wants to select a new channel and/or regulatory class, it may transmit DSE Channel Switch Request frame with new regulatory class/channel number pair fields to an AP. After receiving DSE Channel Switch Request frame, the AP chooses one regulatory class/channel number among the received regulatory class/channel number pairs in order to perform extended channel switch (ECS) procedures and transmits DSE Channel Switch Response frame to the enabling STA.

FIG. 14 shows the format of DSE Channel Switch Request frame.

As shown in FIG. 14, DSE Channel Switch Request frame includes a Category field, an Action field, a RequesterSTAAddress field, a ResponderSTAAddress field, a Length field, a New Regulatory Class and a New Channel Number field.

The Action field is set to the predefined value indicating DSE Channel Switch Request frame. The RequesterSTAAddress field is the MAC address of the requesting STA that grants enablement. The ResponderSTAAddress field is the MAC address of the responding STA that operates based on the enablement. The Length field is set to 2n, where n indicates the total number of Regulatory Class/Channel Number fair fields. The minimum value of the length field is 2.

The New Regulatory Class field is set to the number of the regulatory class after the channel switch. The New Channel Number field is set to the number of the channel after the channel switch.

FIG. 15 shows the format of DSE Channel Switch Response frame.

As shown in FIG. 15, DSE Channel Switch Request frame includes a Category field, an Action field, a RequesterSTAAddress field, a ResponderSTAAddress field, a New Regulatory Class and a New Channel Number field.

The Action field is set to the predefined value indicating DSE Channel Switch Response frame. The RequesterSTAAddress field is the MAC address of the requesting STA that grants enablement. The ResponderSTAAddress field is the MAC address of the responding STA that operates based on the enablement. The New Regulatory Class field is set to the number of the regulatory class after the channel switch. The New Channel Number field is set to the number of the channel after the channel switch.

Figure 16:
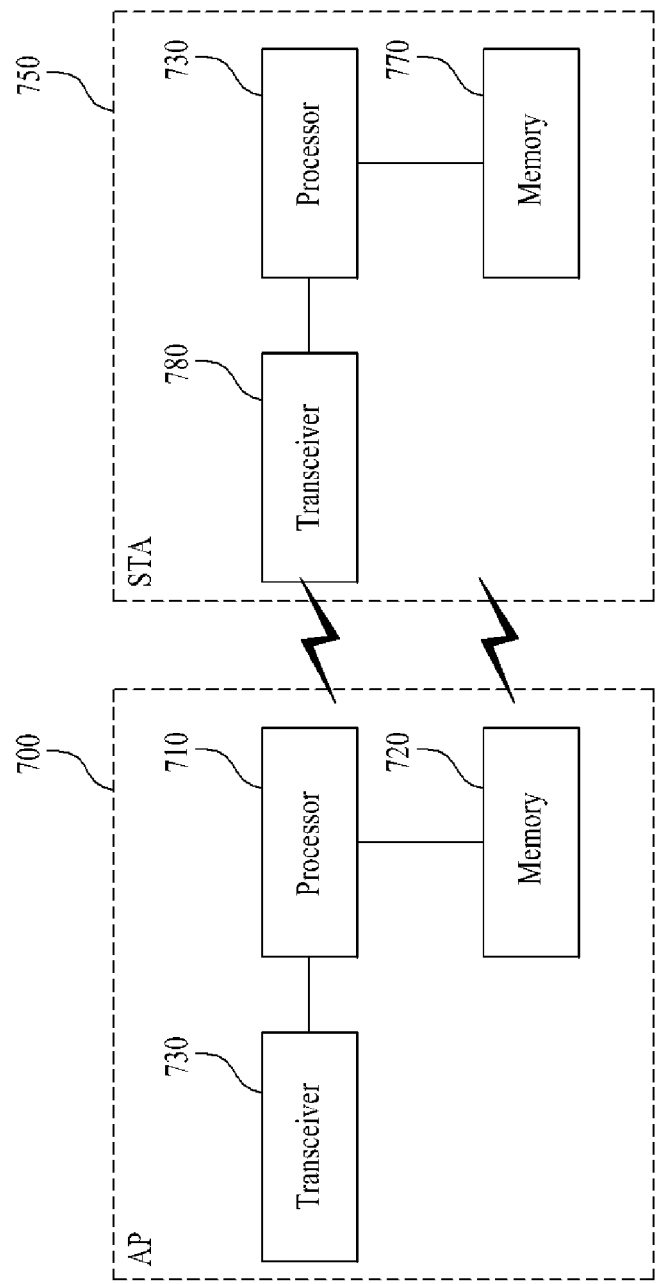
FIG. 16 is a schematic block diagram of wireless apparatuses implementing an exemplary embodiment of the present invention.

FIG. 16 is a schematic block diagram of wireless apparatuses implementing an exemplary embodiment of the present invention.

An AP 700 can include a processor 710, a memory 720, a transceiver 730, and a STA 750 may include a processor 760, a memory 770, and a transceiver 780. The transceivers 730 and 780 transmit/receive a radio signal and implement an IEEE 802 physical layer. The processors 710 and 760 are connected with the transceivers 730 and 760 to implement an IEEE 802 physical layer and/or MAC layer. The processors 710 and 760 may implement the above-described channel scanning method.

The processors 710 and 760 and/or the transceivers 730 and 780 may include an application-specific integrated circuit (ASIC), a different chip set, a logical circuit, and/or a data processing unit. The memories 720 and 770 may include a read-only memory (ROM), a random access memory (RAM), a flash memory, a memory card, a storage medium, and/or any other storage units. When an exemplary embodiment is implemented by software, the above-described scheme may be implemented as a module (process, function, etc.) performing the above-described functions. The module may be stored in the memories 720 and 770 and executed by the processors 710 and 760. The memories 720 and 770 may be disposed within or outside the processors 710 and 760 and connected with the processors 710 and 760 via well-known means.

Among these elements of apparatuses for AP/STA, the structure of processor 710 or 760 will be more specifically explained.

Figure 17:
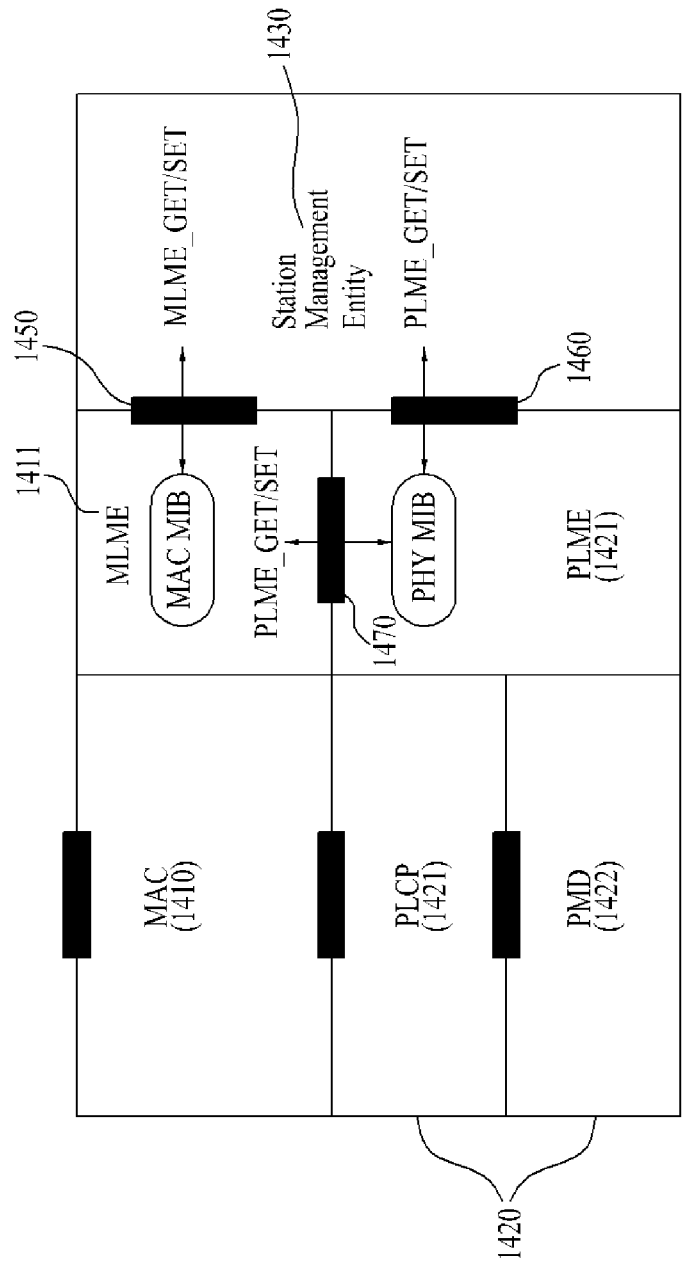
FIG. 17 shows an exemplary structure of processor of STA apparatus according to one embodiment of the present invention.

FIG. 17 shows an exemplary structure of processor of STA apparatus according to one embodiment of the present invention.

Processor 710 or 760 of STA may have multiple layer structures, and FIG. 17 especially focuses on MAC sublayer (1410) on data link layer (DLL) and Physical layer (1420) among these layers. As shown in FIG. 17, PHY (1420) may include PLCP entity (physical layer convergence procedure entity; 1421) and PMD entity (physical medium dependent entity; 1422). Both the MAC sublayer (1410) and PHY (1420) conceptually include management entities, called MLME (MAC sublayer Management Entity; 1411) and PLME (physical layer management entity; 1421), respectively. These entities (1411, 1421) provide the layer management service interfaces through which layer management functions can be invoked.

In order to provide correct MAC operation, an SME (Station Management Entity; 1430) is present within each STA. The SME (1430) is a layer independent entity that can be viewed as residing in a separate management plane or as residing "off to the side." The exact functions of the SME (1430) are not specified in this document, but in general this entity (1430) can be viewed as being responsible for such functions as the gathering of layer-dependent status from the various layer management entities (LMEs), and similarly setting the value of layer-specific parameters. SME (1430) would typically perform such functions on behalf of general system management entities and would implement standard management protocols.

The various entities within FIG. 17 interact in various ways. FIG. 17 shows some examples of exchanging GET/SET primitives. XX-GET.request primitive is used for requesting the value of the given MIBattribute (management information base attribute). XX-GET.confirm primitive is used for returning the appropriate MIB attribute value if status="success," otherwise returning an error indication in the Status field. XX-SET.request primitive is used for requesting that the indicated MIB attribute be set to the given value. If this MIB attribute implies a specific action, then this requests that the action be performed. And, XX-SET.confirm primitive is used such that, if status="success," this confirms that the indicated MIB attribute was set to the requested value, otherwise it returns an error condition in status field. If this MIB attribute implies a specific action, then this confirms that the action was performed.

As shown in FIG. 17, MLME (1411) and SME (1430) may exchange various MLME_GET/SET primitives via MLME_SAP (1450). According to one example of the present invention, SME (1430) may transmit MLME_WSM.request primitive to MLME (1411) for requesting MLME (1411) to transmit the White Space Map Announcement Frame to another STA. In other case, MLME (1411) may transmit MLME-WSM.indication primitive to SME (1430) to indicate the reception of the White Space Map Announcement Frame from another STA.

Also, as shown in FIG. 17, various PLCM_GET/SET primitives may be exchanged between PLME (1421) and SME (1430) via PLME_SAP (1460), and between MLME (1411) and PLME (1470) via MLME-PLME_SAP (1470).

WSM element of one example of the present invention can be transmitted by the sequential procedures of MAC (1410) and PHY (1420). Also, WSM element of one example of the present invention can be received by the sequential procedures of PHY (1420) and MAC (1410).

Although the embodiments of the present invention have been disclosed in view of each aspect of the invention, those skilled in the art will appreciate that embodiments of each aspect of the invention can be incorporated. And, there can be advantages not explicitly discussed, since they are obvious from the description for those skilled in the art.

According to embodiments of the present invention, a station can request operating channel efficiently in a WLAN.

It will be appreciated by persons skilled in the art that that the effects that could be achieved with the present invention are not limited to what has been particularly described hereinabove and other advantages of the present invention will be more clearly understood from the following detailed description taken in conjunction with the accompanying drawings.

What is claimed is:

1. A method for managing channels for operation in a wireless local area network (WLAN), the method comprising:

receiving, by a responding station from a requesting station, a request frame including first information indicating frequencies preferred by the requesting station;

transmitting, by the responding station to a server, the request frame;

receiving, by the responding station from the server, a response frame including second information indicating WLAN network channels confirmed by the server; and transmitting, by the responding station to the requesting station, the response frame, wherein the second information includes:
a second operating class field, and
a second channel number field, wherein the second operating class field indicates a value of an operating class of a second channel included in a second channel set, wherein the second channel number field indicates a value of the second channel, wherein the second operating class field and the second channel number field together specify a second channel frequency, and wherein a second channel bandwidth that the responding station has granted permission for use by the requesting station.

2. The method of claim 1, wherein the first information specifies a first channel frequency and a first channel bandwidth that the requesting station selected.

3. The method of claim 2, wherein the first information includes a first operating class field and a first channel number field.

4. The method of claim 3, wherein:

the first operating class field indicates a value of an operating class of a first channel included in a first channel set;

the first channel number field indicates a value of the first channel; and the first operating class field and the first channel number field together specify the first channel frequency and the first channel bandwidth.

5. The method of claim 1, wherein a White Space Map (WSM) is provided by the responding station to the requesting station.

6. The method of claim 5, wherein the requesting station transmits the request frame whenever the WSM has been changed.

7. The method of claim 1, wherein the WLAN network channels that the server confirms are a same channels specified by the request frame or a subset of the channels specified by the request frame.

8. The method of claim 1, wherein the responding frame includes a maximum transmit power field.

9. The method of claim 1, wherein the request frame and the response frame are transmitted using a Registered Location Query Protocol (RLQP).

10. The method of claim 1, wherein the requesting station is controlled by the operation of a geo-location database in a TV whitespace.

11. An apparatus for managing channels for operation in a wireless local area network (WLAN), the apparatus comprising:
   a transceiver; and
   a processor configured to:
      receive, using the transceiver from a requesting station, a request frame including first information indicating frequencies preferred by the requesting station;
      transmit, using the transceiver to a server, the request frame;
      receive, using the transceiver from the server, a response frame including second information indicating WLAN network channels confirmed by the server; and
   transmit, using the transceiver, to the requesting station, the response frame,
   wherein the second information includes:
      a second operating class field, and
      a second channel number field,
   wherein the second operating class field indicates a value of an operating class of a second channel included in a second channel set,
   wherein the second channel number field indicates a value of the second channel,
   wherein the second operating class field and the second channel number field together specify a second channel frequency, and
   wherein a second channel bandwidth that the responding station has granted permission for use by the requesting station.

* * * * *